United States Patent
Goto et al.

(10) Patent No.: US 8,083,812 B1
(45) Date of Patent: Dec. 27, 2011

(54) SOLID-ELECTROLYTE BATTERY AND MANUFACTURING METHOD THEREFOR

(75) Inventors: Shuji Goto, Miyagi (JP); Koichiro Kezuka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,813

(22) Filed: Feb. 16, 2000

(30) Foreign Application Priority Data

Feb. 19, 1999 (JP) .................... P11-041455

(51) Int. Cl.
- H01M 10/056 (2010.01)
- H01M 10/0565 (2010.01)
- H01M 10/0587 (2010.01)
- H01M 2/02 (2006.01)

(52) U.S. Cl. .................. 29/623.2; 29/623.3; 29/623.4; 429/94; 429/163; 429/303

(58) Field of Classification Search .............. 429/94, 429/300, 304; 29/623.1, 623.2, 623.3, 623.5
See application file for complete search history.

(56) References Cited

U.S. PATENT DOCUMENTS

| | | | |
|---|---|---|---|
| 4,714,665 A | 12/1987 | Siegel et al. | |
| 5,296,318 A | 3/1994 | Gozdz et al. | |
| 5,552,239 A | 9/1996 | Gozdz et al. | |
| 5,558,957 A | 9/1996 | Datta et al. | |
| 5,688,293 A * | 11/1997 | Oliver et al. | 29/623.1 |
| 5,700,300 A * | 12/1997 | Jensen et al. | 29/623.5 |
| 5,837,015 A | 11/1998 | Venugopal et al. | |
| 5,840,087 A * | 11/1998 | Gozdz et al. | 29/623.3 |
| 5,858,264 A * | 1/1999 | Ichino et al. | 252/62.2 |
| 6,106,973 A * | 8/2000 | Sonozaki et al. | 429/127 |
| 6,150,455 A * | 11/2000 | Takamiya et al. | 524/566 |
| 6,156,080 A * | 12/2000 | Kumeuchi et al. | 29/623.1 |
| 6,168,885 B1 * | 1/2001 | Narang et al. | 429/214 |
| 6,180,281 B1 * | 1/2001 | Schneider et al. | 429/129 |
| 2002/0064710 A1 * | 5/2002 | Kawakami et al. | 429/231.95 |

FOREIGN PATENT DOCUMENTS

| | | |
|---|---|---|
| EP | 0 390 557 | 10/1990 |
| EP | 0 825 662 | 2/1998 |
| EP | 860887 * | 8/1998 |
| EP | 0 893 836 | 1/1999 |
| JP | 06-076823 * | 3/1994 |
| JP | 06-290810 | 10/1994 |
| JP | 09 022737 | 1/1997 |
| JP | 09-298066 | 11/1997 |
| JP | 10-092470 | 4/1998 |
| JP | 11-040201 | 2/1999 |
| JP | 11 086848 | 3/1999 |

\* cited by examiner

Primary Examiner — Jonathan Crepeau
(74) Attorney, Agent, or Firm — SNR Denton US LLP

(57) ABSTRACT

A solid-electrolyte battery and a method therefor are disclosed with which the energy density can be raised and the heavy-load resistance can be improved so as to prevent deposition of lithium. The solid-electrolyte battery incorporates an elongated positive electrode; an elongated negative electrode disposed opposite to the positive electrode; and a solid electrolyte layer provided for the surface of at least either of the positive electrode or the negative electrode, wherein the positive electrode and the negative electrode are laminated such that the surfaces on which the solid electrolyte layers have been formed are disposed opposite to each other and wound in the lengthwise direction of the positive electrode and the negative electrode, and the solid-electrolyte layer formed on the positive electrode and the solid-electrolyte layer formed on the negative electrode are integrated with each other so as to be formed into a continuous shape.

4 Claims, 5 Drawing Sheets

SOLID-ELECTROLYTE BATTERY AND MANUFACTURING METHOD THEREFOR

RELATED APPLICATION DATA

The present application claims priority to Japanese Application No. P11-041455 filed Feb. 19, 1999 which application is incorporated herein by reference to the extent permitted by law.

BACKGROUND OF THE INVENTION

1. Field of the Invention

The present invention relates to a solid-electrolyte battery incorporating a wound electrode constituted by, in a lengthwise direction of the laminate, winding elongated positive electrode and negative electrode laminated to sandwich a solid electrolyte and a manufacturing method therefor.

2. Description of the Related Art

In recent years, a multiplicity of pieces of portable electronic apparatus, such as camcorders, portable telephones and portable computers have been marketed. There is a requirement for reduction in the size and weight of the portable electronic apparatus. Also reduction in the size and weight of a battery serving as a portable power source for the electronic apparatus is required. To meet the requirement, a lithium ion battery has been developed and put into practical use. The lithium ion battery is structured such that an ion conducting member disposed between the positive electrode and the negative electrode incorporates a porous polymer separator impregnated with electrolyte solution. To prevent leakage of the electrolyte, the overall body of the battery is packaged in a heavy and thick metal container.

On the other hand, reduction in the size and weight of a solid-electrolyte battery is expected which is structured such that the solid electrolyte is constituted by an ion conducting member between the positive electrode and the negative electrode and free of leakage of the solution. In particular, a solid polymer electrolyte and a gel-like solid electrolyte (hereinafter called a "gel electrolyte"), containing an electrolytic solution in a matrix polymer, is attracting attention.

The gel-electrolyte battery incorporating the gel electrolyte can be manufactured as follows.

The positive electrode is manufactured by uniformly applying a positive-electrode mix containing a positive-electrode active material, a conductive material and a binder to the two sides of a positive-electrode collector. Then, the positive electrode mix is dried so that a positive-electrode active material layer is formed. Then, the layer is dried, and then a roll press is operated so that a positive electrode sheet is obtained.

The negative electrode is manufactured by uniformly applying a negative-electrode mix containing a negative-electrode active material and a binder to the two sides of a negative-electrode collector. Then, the negative-electrode mix is dried so that a negative-electrode active material layer is formed. Then, the layer is dried, and then a roll process is operated so that a negative electrode sheet is obtained.

The gel electrolyte layer is manufactured by uniformly applying a sol electrolyte solution containing nonacqueous solvent, a salt of an electrolyte and matrix polymers to the two sides of the positive electrode sheet and the negative electrode sheet. Then, the solution is dried so that the solvent is removed. Thus, the gel electrolyte layer is formed on each of the positive-electrode active material layer and the negative-electrode active material layer.

Then, the positive electrode sheet on which the gel electrolyte layer has been formed is cut into an elongated shape. Then, the gel electrolyte layer and the positive-electrode active material layer in the portion in which the positive electrode lead will be welded are removed by cutting. Then, the positive electrode lead is welded to the cut portion so that an elongated positive electrode having the gel electrolyte layer formed thereon is manufactured.

Then, the negative electrode sheet on which the gel electrolyte layer has been formed is cut into an elongated shape. Then, the gel electrolyte layer and the negative-electrode active material layer in the portion in which the negative electrode lead will be welded are removed by cutting. Then, the negative electrode lead is welded to the cut portion so that an elongated negative electrode having the gel electrolyte layer formed thereon is manufactured.

A final process is performed such that the elongated positive electrode and the elongated negative electrode each having the gel electrolyte layer are laminated. The laminate is wound in its lengthwise direction many times so that a wound electrode can be obtained. The wound electrode is sandwiched in a packaging film. The outermost end of the packaging film is welded with heat under reduced pressure so that the opening portions are closed. Then, the wound electrode is hermetically enclosed in the packaging film so that the gel electrolyte battery is manufactured.

The gel electrolyte battery incorporating the wound electrode suffers from a low energy density and unsatisfactory heavy-load resistance. What is worse, there arises another problem in that lithium is deposited on the negative electrode.

The reason for this will now be described. Since the gel electrolyte layer formed on the positive electrode and that formed on the negative electrode are not integrated with each other, portions in each of which the gel electrolyte layers cannot be brought into hermetic contact with each other exist. If the portion in which the gel electrolyte layers cannot be brought into hermetic contact with each other exists, doping of lithium ions into the negative electrode, which is performed when a charging operation is performed, is inhibited.

When lithium ions cannot be doped into the negative electrode, a designed discharge capacity cannot be obtained. Thus, the energy density is lowered. Moreover, excessively high internal resistance of the battery causes the heavy-load resistance to deteriorate. In the portions in each of which the gel electrolyte layers cannot be brought into hermetic contact with each other, doping of lithium ions into the negative electrode is not performed when the charging operation is performed. As an alternative to this, growth of dendrite of lithium undesirably takes place from the negative electrode in the portions adjacent to the foregoing portions. The dendrite projects over the gel electrolyte layer. Thus, there is apprehension that minor short circuit occurs.

SUMMARY OF THE INVENTION

In view of the foregoing, an object of the present invention is to provide a solid-electrolyte battery exhibiting a high energy density and satisfactory heat-load resistance and capable of preventing deposition of lithium and a manufacturing method therefor.

According to one aspect of the present invention, there is provided a solid-electrolyte battery comprising: an elongated positive electrode; an elongated negative electrode disposed opposite to the positive electrode; and a solid electrolyte layer provided for the surface of at least either of the positive electrode or the negative electrode, wherein the positive electrode and the negative electrode are laminated such that the surfaces on which the solid electrolyte layers have been formed are disposed opposite to each other and wound in the lengthwise direction of the positive electrode and the negative electrode, and the solid-electrolyte layer formed on the positive electrode and the solid-electrolyte layer formed on the negative electrode are integrated with each other so as to be formed into a continuous shape.

The solid-electrolyte battery according to the present invention is structured such that the solid-electrolyte layer formed on the positive electrode and the solid-electrolyte layer formed on the negative electrode are integrated with each other so as to be formed into the continuous shape. Therefore, lithium ions can satisfactorily be doped into the negative electrode when a charging operation is performed. As a result, the energy density can be raised and the heavy-load resistance can be improved. Moreover, deposition of lithium can be prevented.

According to another aspect of the present invention, there is provided a method of manufacturing a solid-electrolyte battery comprising: a first electrolyte layer forming step for forming a solid-electrolyte layer on a positive electrode; a second electrolyte layer forming step for forming a solid-electrolyte layer on a negative electrode; a winding step for laminating the positive electrode having the solid-electrolyte layer formed thereon and the negative electrode having the solid-electrolyte layer formed thereon such that the surfaces on which the solid-electrolyte layers have been formed are disposed opposite to each other and winding the positive electrode and the negative electrode to form wound electrodes; and a heat treatment step for subjecting the wound electrodes obtained in the winding step to heat treatment so that the solid-electrolyte layer formed on the positive electrode and the solid-electrolyte layer formed on the negative electrode are integrated with each other.

The method of manufacturing the solid-electrolyte battery according to the present invention has the heat treatment step for subjecting the solid-electrolyte layer formed on the positive electrode and that formed on the negative electrode to the heat treatment to integrate the solid-electrolyte layers with each other. Therefore, lithium ions can satisfactorily be doped into the negative electrode when a charging operation is performed. As a result, there is provided a solid-electrolyte battery with which the energy density can be raised and the heavy-load resistance can be improved and which is capable of preventing deposition of lithium.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described.

Figure 1:
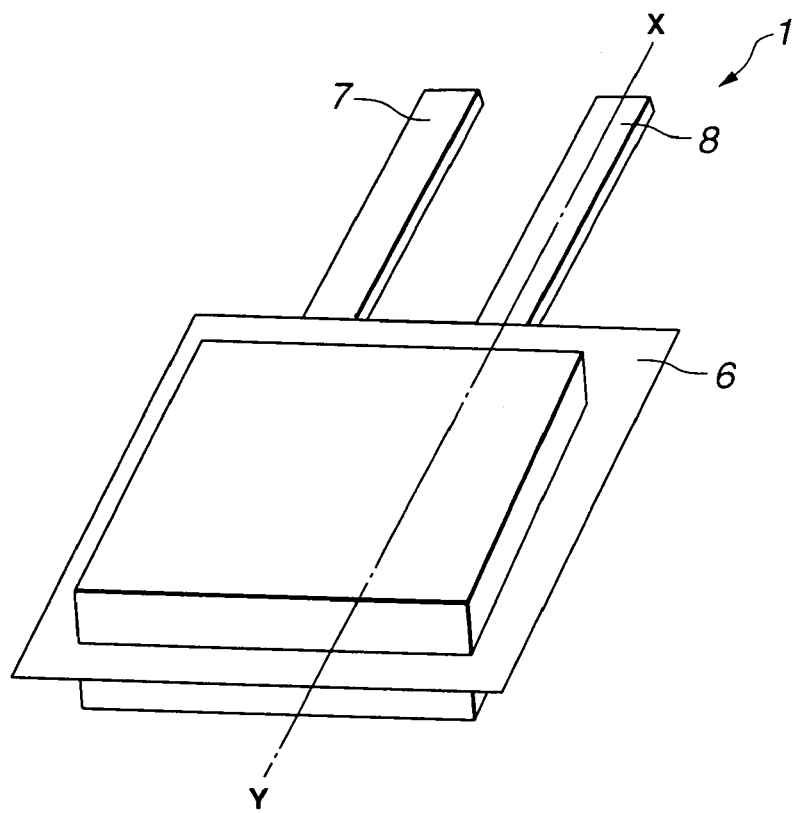
FIG. 1 is a perspective view showing an example of the structure of a solid-electrolyte battery according to the present invention.
Figure 2:
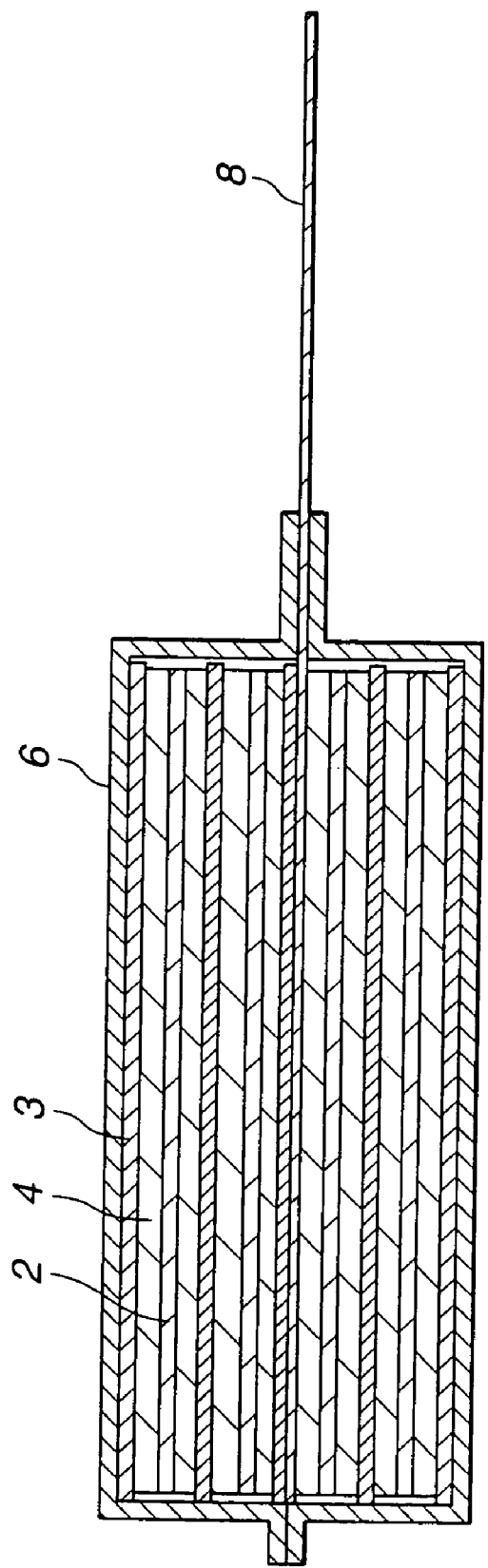
FIG. 2 is a cross sectional view taken along line X-Y shown in FIG. 1.
Figure 3:
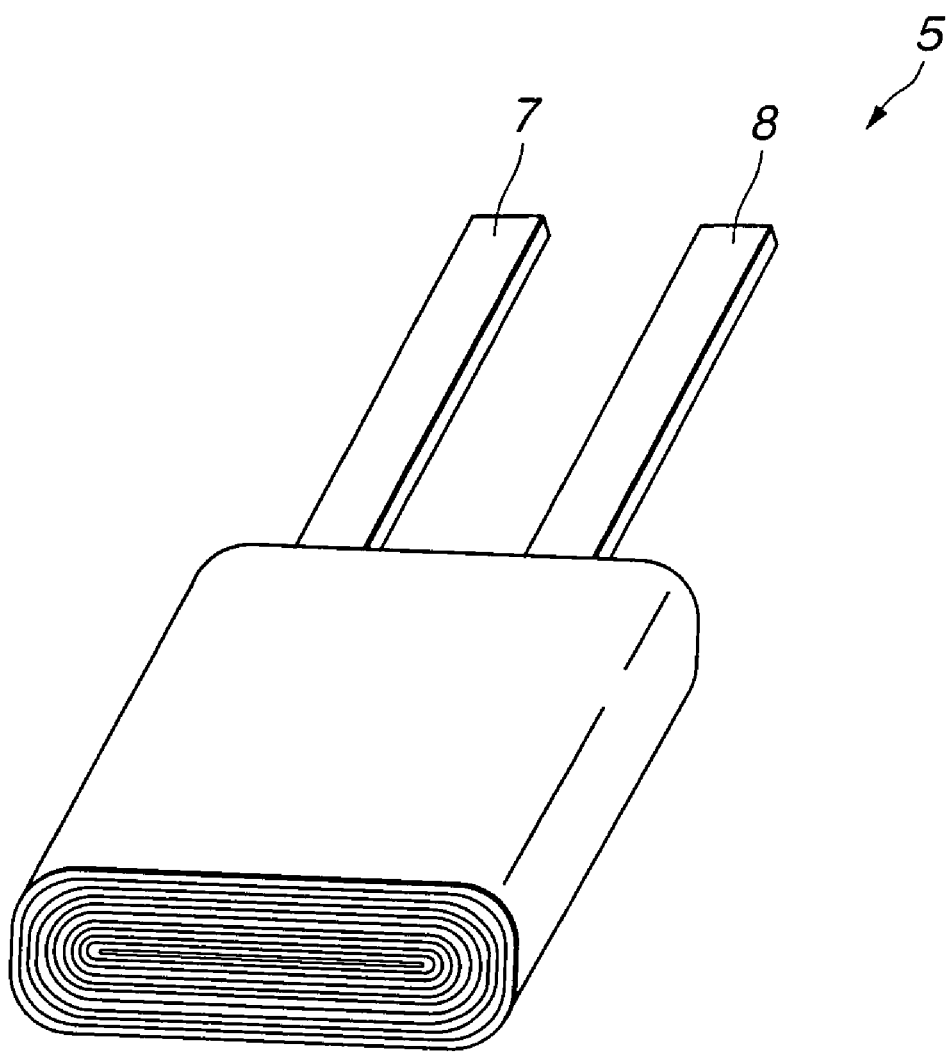
FIG. 3 is a perspective view showing a state in which a positive electrode and a negative electrode have been formed into wound electrodes.

An example of the structure of a gel electrolyte battery according to this embodiment is shown in FIGS. 1 and 2. The gel electrolyte battery 1 incorporates an elongated positive electrode 2, an elongated negative electrode 3 disposed opposite to the positive electrode 2 and a gel electrolyte layer 4 disposed between the positive electrode 2 and the negative electrode 3. The gel electrolyte battery 1 incorporate a wound electrode 5 constituted by laminating the positive electrode 2 and the negative electrode 3 through a gel electrolyte layer 4 and by winding the positive electrode 2 and the negative electrode 3 in the lengthwise direction as shown in FIG. 3. The wound electrode 5 is covered with a packaging film 6 made of an insulating material so as to be hermetically sealed. A positive-electrode terminal 7 is connected to the positive electrode 2, while a negative-electrode terminal 8 is connected to the negative electrode 3. The positive-electrode terminal 7 and the negative-electrode terminal 8 are sandwiched in a sealed portions which are peripheral portions of the packaging film 6.

Figure 4:
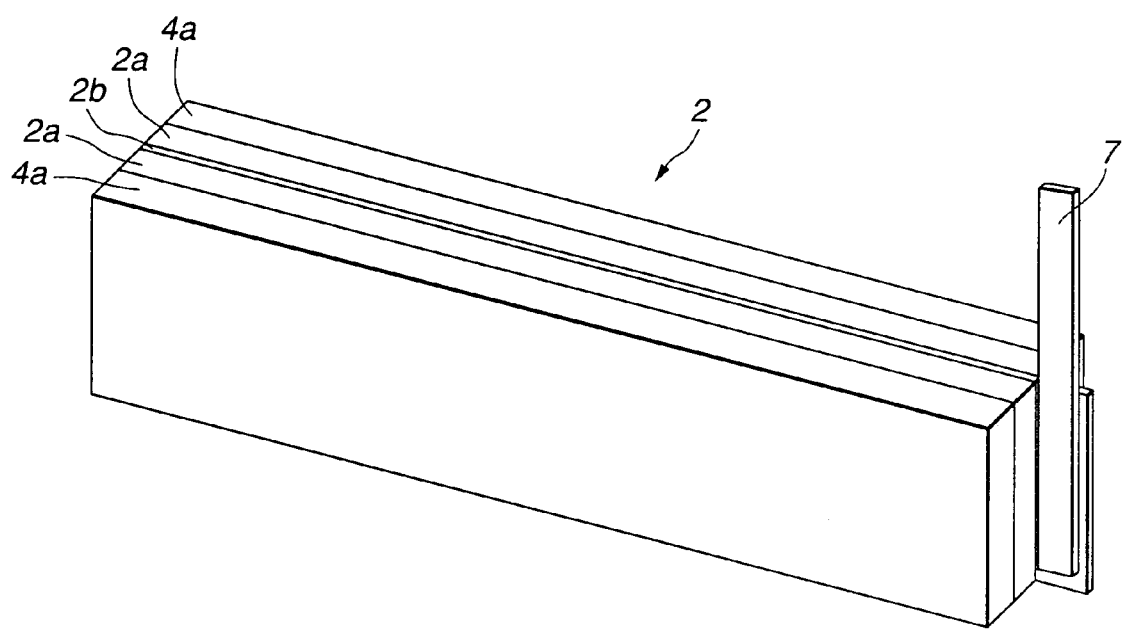
FIG. 4 is a perspective view showing an example of the structure of the positive electrode.

As shown in FIG. 4, the positive electrode 2 has a positive-electrode active material layer 2a containing a positive-electrode active material formed on each of the two sides of a positive-electrode collector 2b. The positive-electrode collector 2b is constituted by, for example, metal foil, such as aluminum foil.

The positive-electrode active material may be lithium cobalt acid, lithium nickel acid, lithium manganese acid, a material obtained by substituting other transition metal for a portion of each of the composite oxides, a transition metal compound, such as manganese dioxide or vanadium pentoxide, or a calcogen compound of transition metal, such as iron sulfide.

FIG. 4 shows a state in which a gel-electrolyte layer 4a, to be described later, has been formed on the positive-electrode active material layer 2a of the positive electrode 2.

Figure 5:
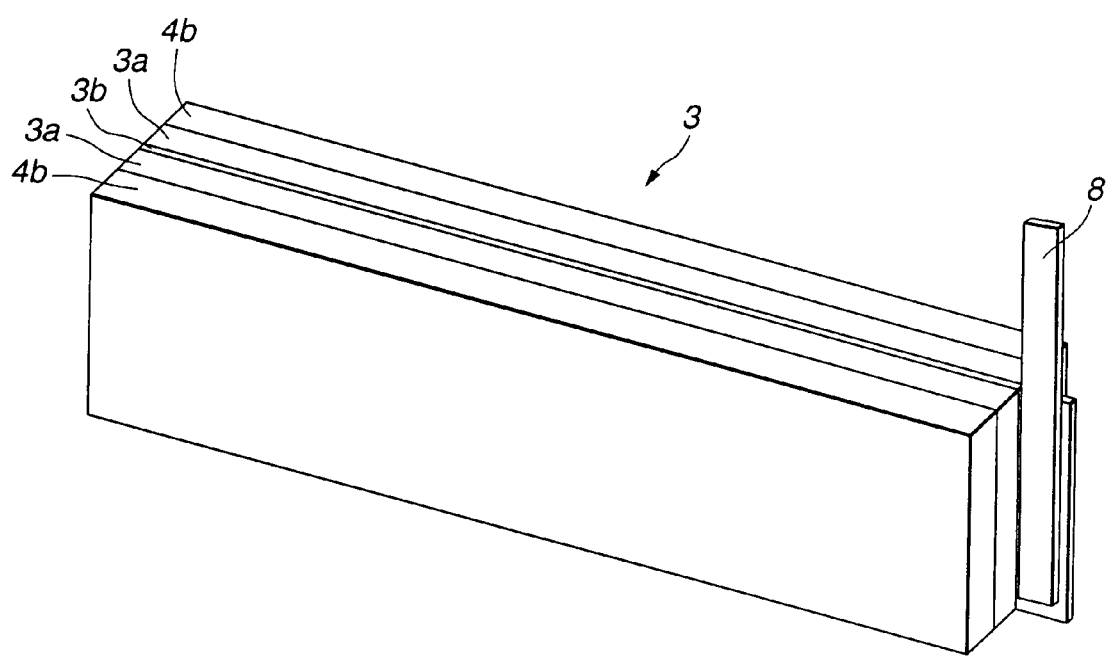
FIG. 5 is a perspective view showing an example of the structure of the negative electrode.

As shown in FIG. 5, the negative electrode 3 incorporates a negative-electrode collector 3b having two sides on each of which a negative-electrode active material layer 3a containing the negative-electrode active material is formed. The negative-electrode collector 3b is constituted by metal foil, such as copper foil.

The negative-electrode active material is made of a material of a type which is capable of doping/dedoping lithium. The material which is capable of doping/dedoping lithium is exemplified by carbon black, such as pyrocarbon, cokes or acetylene black; a carbon material, such as graphite, vitreous carbon, active carbon, a sintered material of organic polymer, a sintered material of coffee beans, a sintered material of cellulose or a sintered material of bamboo; and a conductive polymer, such as lithium, an lithium alloy or polyacetylene.

FIG. 5 shows a state in which a gel-electrolyte layer 4b, to be described later, has been formed on a negative-electrode active material layer 3a of the negative electrode 3.

The gel electrolyte layer 4 contains an electrolyte salt, matrix polymers and swelling solvent serving as a plasticizer.

The electrolyte salt may be any one of $LiPF_6$, $LiAsF_6$, $LiBF_4$, $LiClO_4$, $LiCF_3SO_3$, $Li(CF_3SO_2)_2N$ and $LiC_4F_9SO_3$ or their mixture.

When the matrix polymer has ion conductivity higher than 1 mS/cm at room temperatures, the chemical structure of the matrix polymer is not limited. The matrix polymer is exemplified by polyacrylonitrile, polyvinylidene fluoride, polytetrafluoroethylene, polyhexafluoropropylene, polyethylene oxide, polypropylene oxide, polyphosphagen, polysiloxane, polyvinyl acetate, polyvinyl alcohol, polymethyl methacryate, polyacrylic acid, polymethacrylic acid, styrene-butadiene rubber, nitrile-butadiene rubber, polystyrene or polycarbonate.

The swelling solvent may be any one of the following nonaqueous solvent, ethylene carbonate, propylene carbonate, butylene carbonate, γ-butylolactone, γ-valerolactone, diethoxyethane, tetrahydrofuran, 2-methyltetrahydrofuran, 1,3-dioxane, methyl acetate, methyl propionate, dimethylcarbonate, diethyl carbonate or ethylmethyl carbonate or their mixture.

As shown in FIG. 4, the gel electrolyte battery 1 according to the present invention incorporates the positive-electrode active material layer 2a of the positive electrode 2 on which the gel-electrolyte layer 4a is formed. As shown in FIG. 5, the gel-electrolyte layer 4b is formed on the negative-electrode active material layer 3a of the negative electrode 3. As shown in FIGS. 2 and 3, the gel electrolyte battery 1 incorporates the positive electrode 2 and the negative electrode 3 which are laminated through the gel electrolyte layer 4 and wound in the lengthwise direction so as to be formed into the wound electrode 5.

The gel electrolyte battery 1 has a structure that the gel-electrolyte layer 4a formed on the positive electrode 2 and the gel-electrolyte layer 4b formed on the negative electrode 3 are joined to be continued and integrated with each other. Since the gel-electrolyte layer 4a formed on the positive electrode 2 and the gel-electrolyte layer 4b formed on the negative electrode 3 are continued and integrated with each other, lithium ions can satisfactorily be doped into the negative electrode 3 when the charging operation is performed. Since lithium ions can satisfactorily be doped into the negative electrode 3 when the charging operation is performed, a large discharge capacity can be realized. Thus, the energy density can be raised. Moreover, formation of dendrite of lithium in the negative electrode 3 can be prevented during the charging operation. As a result, internal short circuit caused from growth of dendrite of lithium can be prevented.

Therefore, the gel electrolyte battery 1 according to this embodiment and having the structure that the gel-electrolyte layer 4a formed on the positive electrode 2 and the gel-electrolyte layer 4b formed on the negative electrode 3 are continued and integrated with each other enables the energy density to be raised and the heavy-load resistance to be improved. Moreover, internal short circuit caused from deposition of lithium can be prevented so that satisfactory durability is realized.

A method of manufacturing the gel electrolyte battery 1 will now be described.

The positive electrode 2 is manufactured as follows: a positive-electrode mix containing the positive-electrode active material and the binder is uniformly applied to the surface of the metal foil, such as aluminum foil which is formed into the positive-electrode collector 2b. Then, the positive-electrode mix is dried so that the positive-electrode active material layer 2a is formed. Thus, a positive electrode sheet can be manufactured. The binder for the positive-electrode mix may be a known binder or a material obtained by adding a known additive to the foregoing positive-electrode mix.

Then, the gel-electrolyte layer 4a is formed on the positive-electrode active material layer 2a of the positive electrode sheet. To form the gel-electrolyte layer 4, an electrolyte salt is dissolved in the nonaqueous solvent so that a nonaqueous electrolytic solution is prepared. Then, the matrix polymers are added to the nonaqueous electrolytic solution, and the solution is sufficiently stirred so that the matrix polymers are dissolved. Thus, the sol electrolytic solution is prepared.

Then, the electrolyte solution is applied to the surface of the positive-electrode active material layer 2a in a predetermined quantity. Then, the temperature is lowered to the room temperature so that the matrix polymers are gelled and the gel-electrolyte layer 4a is formed on the positive-electrode active material layer 2a.

Then, the positive electrode sheet having the gel-electrolyte layer 4a formed thereon is cut into an elongated shape. Then, the gel-electrolyte layer 4a and the positive-electrode active material layer 2a in the portions in which the positive electrode lead will be welded are removed by cutting. Then, for example, an aluminum lead wire is welded to the foregoing portion so that a positive-electrode terminal 7 is formed. Thus, the elongated positive electrode 2 having the gel-electrolyte layer 4a formed thereon can be manufactured.

The negative electrode 3 is manufactured as follows: a negative-electrode mix containing a negative-electrode active material and a binder is uniformly applied to the surface of metal foil, such as copper foil, which will be formed into the negative-electrode collector 3b. Then, the negative-electrode mix is dried so that the negative-electrode active material layer 3a is formed. Thus, a negative electrode sheet is manufactured. The binder for the negative electrode may be known binder or a material obtained by adding a known additive to the negative-electrode mix.

Then, the gel-electrolyte layer 4b is formed on the negative-electrode collector 3b of the negative electrode sheet. To form the gel electrolyte layer 4, the electrolyte solution prepared by a method similar to the foregoing process is applied to the surface of the negative-electrode active material layer in a predetermined quantity. Then, the electrolyte solution is cooled at room temperatures so that the matrix polymers are gelled. Thus, the gel-electrolyte layer 4b is formed on the negative-electrode collector 3b.

Then, the negative electrode sheet having the gel-electrolyte layer 4b formed thereon is cut into an elongated shape. Then, the gel-electrolyte layer 4b and the negative-electrode active material layer 3a in the portion to which the positive electrode lead will be welded are removed by cutting. Then, for example, a nickel lead wire is welded to the portion so that the negative-electrode terminal 8 is manufactured. Thus, the elongated negative electrode 3 having the gel-electrolyte layer 4b formed thereon can be manufactured.

Then, the thus-manufactured elongated positive electrode 2 and negative electrode 3 are bonded to each other in such a manner that the surfaces on which the gel-electrolyte layers 4a and 4b are formed are disposed opposite to each other. Then, the laminate is pressed so that an electrode laminate is manufactured. Then, the electrode laminate is wound in the lengthwise direction so that the wound electrode 5 is obtained.

Finally, the wound electrode 5 is packaged in the packaging film 6 constituted by the insulating material. Moreover, the positive-electrode terminal 7 and the negative-electrode terminal 8 are sandwiched in the sealing portions. Then, the wound electrode 5 packaged in the packaging film 6 is subjected to heat treatment at about 100° C. for 10 minutes. As a result, the heat treatment, the gel-electrolyte layer 4a formed on the positive electrode 2 and the gel-electrolyte layer 4b formed on the negative electrode 3 are joined and integrated so as to be continuous shape. Thus, the gel electrolyte battery 1 can be manufactured.

The gel electrolyte battery 1 according to this embodiment may have a cylindrical shape or a rectangular shape. Moreover, the size and the thickness are not limited. For example, a thin structure or a large structure may be employed.

The foregoing embodiment has been described about the gel electrolyte battery 1 containing the swelling solvent and incorporating the gel solid electrolyte as the solid electrolyte battery. The present invention is not limited to the foregoing description. The present invention may be applied to a solid electrolyte battery which incorporates a solid electrolyte which does not contain the swelling solvent. The present invention may be applied to a primary battery or a secondary battery.

EXAMPLES

Gel electrolyte batteries were manufactured to evaluate the characteristics of the batteries so as to confirm the effects of the invention.

Example 1

The positive electrode was manufactured as follows: initially lithium carbonate in a quantity of 0.5 mole and cobalt carbonate in a quantity of 1 mole were mixed with each other. Then, the mixture was baked at 900° C. for 5 hours in the air. Thus, $LiCoO_2$ which was a positive-electrode active material was prepared. Then, 91 parts by weight of $LiCoO_2$, 6 parts by weight of graphite serving as a conductive agent and 3 parts by weight of polyvinylidene fluoride were mixed with one another, and then dispersed in N-methyl pyrolidone. Thus, slurry was prepared. Then, the slurry was uniformly applied to the two sides of a positive-electrode collector having a thickness of 20 μm and constituted by aluminum foil. Then, the two sides were dried so that a positive-electrode active material layer was formed. The layer was dried, and then the positive-electrode collector was pressed by a roll press so that a positive electrode sheet was manufactured. The density of the positive-electrode active material was 3.6 g/cm$^3$.

Then, a gel electrolyte layer was formed on the positive electrode. To form the gel electrolyte layer, 42.5 parts by weight of ethylene carbonate, 42.5 parts by weight of propylene carbonate and 15 parts by weight of $LiPF_6$ were mixed with one another so that a plasticizer was prepared. Then, the plasticizer in a quantity of 30 parts by weight, 10 parts by weight of a material serving as a matrix polymer and obtained by copolymerizing vinylidene fluoride and hexafluoropropylene at a weight ratio of 97:3 and 60 parts by weight of tetrahydrofuran were mixed and dissolved. Thus, electrolyte solution in a sol condition was obtained.

Then, the electrolyte solution was uniformly applied to the two sides of the positive electrode sheet, and then the sheet was dried to remove tetrahydrofuran. Thus, a gel electrolyte layer having a thickness of 100 μm was formed on the positive-electrode active material layer.

The positive electrode sheet having the gel electrolyte layer formed thereon was cut so that a member formed into a shape that a 50 mm×5 mm portion to which a lead was welded was provided for a 50 mm×260 mm portion was obtained. The gel electrolyte layer and the positive-electrode active material layer in the portion to which the lead was welded were removed by cutting. Then, an aluminum lead was welded to the cut portion so that a positive electrode terminal was formed. Thus, an elongated positive electrode having two sides on each of which the gel electrolyte layer having a thickness of 100 μm formed thereon was manufactured.

Then, a negative electrode was manufactured as follows.

Initially, 90 parts by weight of graphite and 10 parts by weight of polyvinylidene fluoride were mixed with each other. Then, the mixture was dispersed in N-methyl pyrolidone so as to be slurried. Then, the slurry was uniformly applied to the two sides of a negative-electrode collector having a thickness of 10 μm and constituted by copper foil. Then, the negative-electrode collector was dried so that a negative-electrode active material layer was formed. Then, the negative-electrode collector was dried, and then pressed by a roll press. Thus, a negative electrode sheet was manufactured. The density of the negative-electrode active material was 1.6 g/cm$^3$.

Then, a gel electrolyte layer was formed on the negative electrode. To form the gel electrolyte layer, electrolyte solution prepared by a method similar to the foregoing process was uniformly applied to the two sides of the negative electrode sheet, and then the negative electrode sheet was dried to remove tetrahydrofuran. Thus, the gel electrolyte layer having a thickness of 100 μm was formed on the negative-electrode active material layer.

The negative electrode sheet having the gel electrolyte layer formed thereon was cut so that a member formed into a shape that a 52 mm×5 mm portion to which a lead was welded was provided for a 52 mm×300 mm portion was obtained. The gel electrolyte layer and the negative-electrode active material layer in the portion to which the lead was welded were removed by cutting. Then, a nickel lead was welded to the portion so that negative electrode terminal was formed. Thus, an elongated negative electrode was manufactured which had two sides on each of which a gel electrolyte layer having a thickness of 100 μm was formed.

Then, the elongated positive electrode having the two sides on which the gel electrolyte layers were formed and the elongated negative electrode having the two sides on which the gel electrolyte layers were formed were laminated so that a laminate was constituted. Then, the laminate was wound in its lengthwise direction so that a wound electrode was obtained.

Then, the wound electrode was sandwiched by a packaging film constituted by laminating a nylon layer having a thickness of 25 μm, an aluminum layer having a thickness of 40 μm and a polypropylene layer having a thickness of 30 μm when the laminate was viewed from outside. Then, the outer end of the packaging film was welded under reduced pressure so that the opening was closed. That is, the wound electrode was sealed in the packaging film. At this time, the positive electrode terminal and the negative electrode terminal were sandwiched in the sealed portions of the packaging film.

Then, the packaging film hermetically accommodating the wound electrode was allowed to stand in an oven set to 100° C. for 10 minutes so that the wound electrode was subjected to heat treatment. Thus, a gel electrolyte battery was manufactured.

Example 2

A process similar to that according to Example 1 was performed except for a step in which the wound electrode was hermetically enclosed in a packaging film and allowed to stand in the oven set to 70° C. for 10 minutes to subject the wound electrode to heat treatment. Thus, a gel electrolyte battery was manufactured.

Comparative Example

A process similar to that according to Example 1 was performed except for a step in which the wound electrode was hermetically enclosed in a packaging film and the heat treatment of the wound electrode was omitted. Thus, a gel electrolyte battery was manufactured.

Each of a plurality of gel electrolyte batteries according to Example 1, Example 2 and the comparative example was extracted, decomposed and observed.

As a result, the gel electrolyte battery according to Example 1 had a structure that the gel electrolyte layer formed on the positive electrode and that formed on the negative electrode were completely fused and integrated with each other. Moreover, the two gel electrolyte layers were free of any interface. That is, a single layer was realized. The gel electrolyte battery according to Example 2 had an interface between the gel electrolyte layer formed on the positive electrode and that formed on the negative electrode. However, the two gel electrolyte layers were completely brought into intimate contact with each other. On the other hand, the gel electrolyte battery according to the comparative example had a structure that the gel electrolyte layer formed on the positive electrode and that formed on the negative electrode were not joined to each other. That is, separation of the two gel electrolyte layers from each other was permitted. Also an interface was easily detected between the two gel electrolyte layers.

Therefore, the heat treatment of the wound lithium enabled the gel electrolyte layer formed on the positive electrode and that formed on the negative electrode to be joined and integrated with each other.

Then, 10 gel electrolyte batteries were extracted from the gel electrolyte batteries according to Example 1, Example 2 and the comparative example so that charge and discharge tests were performed.

The charge and discharge tests were performed by using a potentio-galvanostat such that an operation of charging a constant current of 90 mA was started. When the voltage of a closed circuit was raised to 4.2 V, the charging method was switched to charging of constant voltage. The charging operation was completed after a lapse of 8 hours from start of the charging operation. Then, discharge of a constant current of 90 mA was performed. When the voltage of the closed circuit was raised to 3.0 V, the discharging operation was completed. Then, the discharge capacity of each battery was measured such that discharge of 90 mA was performed. In accordance with the discharge capacity, the energy density of each battery was detected.

Then, charge was again performed under the same conditions as the conditions under which the foregoing charge and discharge tests were performed. Then, discharge of a constant current of 1350 mA was performed. When the voltage of the closed circuit was raised to 3.0 V, discharge was completed. Then, the discharge capacity of each battery was measured such that discharge of 1350 mA was performed.

The discharge capacity in a case of discharge of 90 mA, energy density and the discharge capacity in a case of discharge of 1350 mA of each of the batteries according to Example 1, Example 2 and the comparative example were collectively shown in Table 1. Note that Table 1 shows an average value of 10 batteries.

TABLE 1

|  | 90 mA Discharge Capacity (mAh) | Energy Density (Wh/l) | 1350 mA Discharge Capacity (mAh) |
| --- | --- | --- | --- |
| Example 1 | 450 | 178 | 414 |
| Example 2 | 450 | 178 | 403 |
| Comparative example | 390 | 154 | 258 |

As can be understood from Table 1, the battery according to Examples 1 or 2 and structured such that the wound electrode was hermetically enclosed in the packaging film and the wound electrode was subjected to the heat treatment enabled doping of lithium into the negative electrode to satisfactorily be performed. As a result, a large discharge capacity and a high energy density were realized. On the other hand, the battery according to the comparative example and structured such that the heat treatment of the wound electrode was omitted encountered unsatisfactory doping of lithium into the negative electrode. Therefore, the discharge capacity was unsatisfactorily low and, therefore, a poor energy density was realized.

Hence it follows that the heat treatment of the wound electrode to integrate the gel electrolyte layer formed on the positive electrode and that formed on the negative electrode with each other enabled doping of lithium to the negative electrode to satisfactorily be performed. Therefore, a large discharge capacity and a high energy density were realized.

The batteries according to Example 1, Example 2 and the comparative example were charged by a method similar to that employed in the foregoing charge and discharge tests. Then, the battery which was charged was decomposed to observe the surface of the negative electrode.

As a result, the negative electrode of each of the batteries according to Example 1 and Example 2 was in uniform gold. That is, lithium was uniformly doped into the overall surface of the negative electrode. On the other hand, the battery according to the comparative example encountered partially insufficient doping of lithium. Black portions retained. Moreover, deposition of lithium in the vicinity of the black portions were detected.

Therefore, the heat treatment of the wound electrode to integrate the gel electrolyte layer formed on the positive electrode and that formed on the negative electrode with each other enabled doping of lithium to the negative electrode to satisfactorily be performed. Therefore, deposition of lithium to the negative electrode was prevented.

According to the present invention, the solid-electrolyte layer formed on the positive electrode of the solid-electrolyte battery and that formed on the negative electrode of the same were integrated with each other. Thus, doping of lithium ions into the negative electrode can satisfactorily be performed when a charging operation is performed. Moreover, growth of lithium on the negative electrode can be prevented.

Therefore, the present invention is able to provide the solid-electrolyte battery exhibiting a large discharge capacity and a high gel electrolyte layer density and capable of preventing internal short circuit caused from deposition of lithium to improve the durability.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of manufacturing a solid-electrolyte battery comprising:

forming a first set of gel-electrolyte layers on both sides of a positive electrode collector;

forming a second set of gel-electrolyte layers on both sides of a negative electrode collector;

forming a positive electrode comprising the first set of gel-electrolyte layers on both sides of the positive electrode collector;

forming a negative electrode comprising the second set of gel-electrolyte layers on both sides of a negative electrode collector;

laminating said positive electrode and said negative electrode such that one of the first set of gel-electrolyte layers and one of the second set of gel-electrolyte layers face each other;

winding said positive electrode and said negative electrode such that another one of the first set of gel-electrolyte layers and one of the second set of gel-electrolyte layers face each other;

sealing the wound electrode in a film pack formed by laminating a nylon layer, an aluminum layer and a polypropylene layer on the wound electrode and welding an outer end of the film pack; and after sealing said wound electrodes into the film pack, subjecting said wound electrodes to heat treatment so that each of the first set of gel-electrode layers and the one of the second set of gel-electrolyte layers facing each other are integrated with each other into one continuous seamless layer by heating the laminated electrode in an atmosphere having a temperature of between 70 and 100 degrees C., wherein, said gel-electrolyte layers comprise an electrolyte salt, a matrix polymer, and a swelling solvent serving as a plasticizer, said gel-electrolyte layers comprises $LiPF_6$, the positive electrode active material has a density of 3.6 g/cm$^3$ and the negative electrode active material has a density of 1.6 g/cm$^3$, said matrix polymer includes polyvinylidene flouride and polyhexafluoropropylene, and the matrix polymer has an ion conductivity higher than 1 mS/cm at room temperatures.

2. The method of claim 1, wherein said wound electrodes are subjected to heat treatment for ten minutes.

3. The method of claim 1, wherein said nonaqueous solvent is selected from the group consisting of ethylene carbonate, propylene carbonate, butylene carbonate, γ-butylolactone, γ-valerolactone, diethoxyethane, tetrahydrofuran, 2-methyltetrahydrofuran, 1,3-dioxane, methyl acetate, methyl propionate, dimethylcarbonate, diethyl carbonate or ethylmethyl carbonate or their mixture.

4. A method of manufacturing a solid-electrolyte battery comprising:

forming gel-electrolyte layers on both sides of a positive electrode and a negative electrode, wherein one of said solid-electrolyte layers formed on said positive electrode and one of said gel-electrolyte layers formed on said negative electrode face each other;

winding said positive electrode and said negative electrode after pressing;

sealing the wound electrode in a film pack formed by laminating a nylon layer, an aluminum layer and a polypropylene layer on the wound electrode and welding an outer end of the film pack; and after sealing said wound electrodes into the film pack, subjecting said wound electrodes to heat treatment so that said gel-electrolyte layers formed on said positive electrode and said gel-electrolyte layers formed on said negative electrode are integrated with each other into one continuous seamless layer by heating the laminated electrode in an atmosphere having a temperature of between 70 and 100 degrees C., wherein, said gel-electrolyte layers comprise an electrolyte salt, a matrix polymer, and a swelling solvent serving as a plasticizer said gel-electrolyte layers comprises $LiPF_6$, the positive electrode active material has a density of 3.6 g/cm$^3$ and the negative electrode active material has a density of 1.6 g/cm$^3$, said matrix polymer includes polyvinylidene flouride and polyhexafluoropropylene, and the matrix polymer has an ion conductivity higher than 1 mS/cm at room temperatures.

\* \* \* \* \*